T. KOTELMACH.
COW HOLDER.
APPLICATION FILED APR. 6, 1922.

1,435,399. Patented Nov. 14, 1922.

INVENTOR.
Tomasz Kotelmach
BY
George C. Heinicky
ATTORNEY

Patented Nov. 14, 1922.

1,435,399

UNITED STATES PATENT OFFICE.

TOMASZ KOTELMACH, OF PETROFKA, SASKATCHEWAN, CANADA, ASSIGNOR OF ONE-THIRD TO MICHAL HNATIUK, OF KRYDROR, SASKATCHEWAN, CANADA.

COW HOLDER.

Application filed April 6, 1922. Serial No. 550,063.

*To all whom it may concern:*

Be it known that I, TOMASZ KOTELMACH, a citizen of Poland, residing at Petrofka, Province of Saskatchewan, and Dominion of Canada, have invented certain new and useful Improvements in Cow Holders, of which the following is a specification.

The present invention relates to means for preventing a cow, or cattle in general, from straying from the pasture into woods or beyond certain enclosures.

It is the principal object of the invention to provide a device of this character which will cause pain to the animal and induce it to avoid certain places which it is desired to avoid.

Another object of the invention is the provision of an extremely simple, and inexpensive yet efficient device of this character which can be readily attached and removed from an animal.

Further objects and advantages of my invention will become more fully known as the description proceeds, and will then be specifically pointed out in the appended claim.

In the accompanying drawing, forming a material part of this invention,

Figure 1:
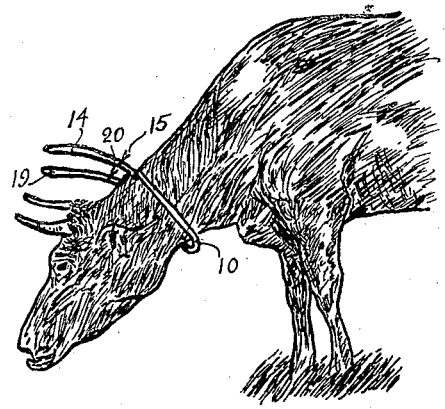
Figure 1 illustrates the application of a device constructed according to the present invention to an animal.
Figure 2:
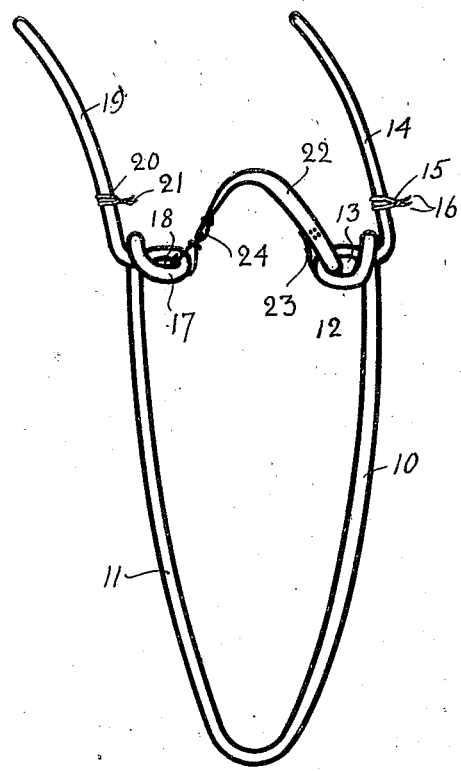
Figure 2 is a perspective detail view of my device.

The device is preferably made of a piece of wire or the like formed to present two shanks 10 and 11. The shank 10 is bent as at 12 to form a loop 13 and then guided upwardly to form a guard 14 adapted to carry one or a plurality of prongs 15 formed by suitably twisting a piece of wire around guard 14, the ends of which prongs are provided with sharp points 16. The other shank 11 is also twisted at the place opposite to the bend 12 of shank 10 as at 17 to form a loop 18, and then upwardly to form a guard 19 to which also one or a plurality of prongs 20 with sharpened or pointed ends 21 are secured.

A strap 22 is secured at one of its ends in loop 13 as indicated at 23, and the other end of this strap is removably secured in a manner indicated at 24 to the loop 18. Thus, shanks 10 and 11 and strap 22 form a yoke for attaching the device to a cow's neck.

The device is attached to a cow as indicated in Figure 1.

It will be clear that a cow when for instance entering a wooded piece of land or trying to break through a fence will engage with the guards 14 and 19, the obstructions offered by branches, fence wires, etc., which will dig the sharp ends 16 and 21 of the prongs 15 and 20 respectively into the skin of the cow and the same will be deterred from proceeding further in the same direction and will remain on its pasture.

It will be clear that changes may be made in the general arrangement of my device and in the combination of elements or minor details forming the same without deviating from the scope and spirit thereof.

What I claim as new and desire to protect by a United States Letters Patent is—

In a device of the class described, comprising a wire yoke having its upwardly directed shanks bent backwardly, laterally and upwardly to form oppositely disposed loops, a supporting strap detachably secured with its ends in said loops, the upwardly extending wire shanks forming guard arms, and wire pieces twisted around said shanks near their lower ends to form prongs adapted to prick the animal.

In testimony whereof I have affixed my signature.

TOMASZ KOTELMACH.